Dec. 2, 1947.    J. A. ZIPSER    2,432,059
LOCKING DEVICE
Filed May 28, 1946
FIGURE 1
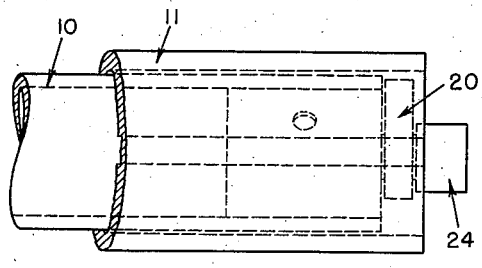
FIGURE 2
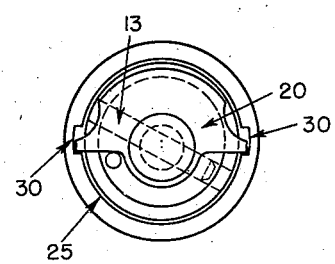
FIGURE 3
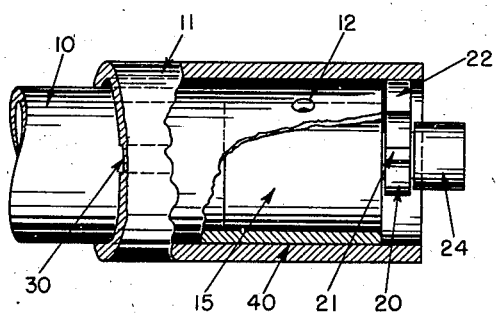
FIGURE 4
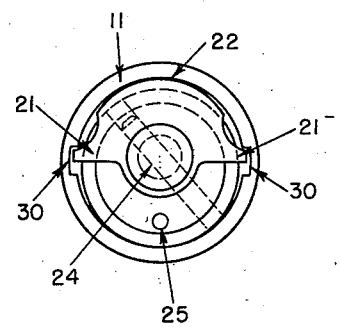
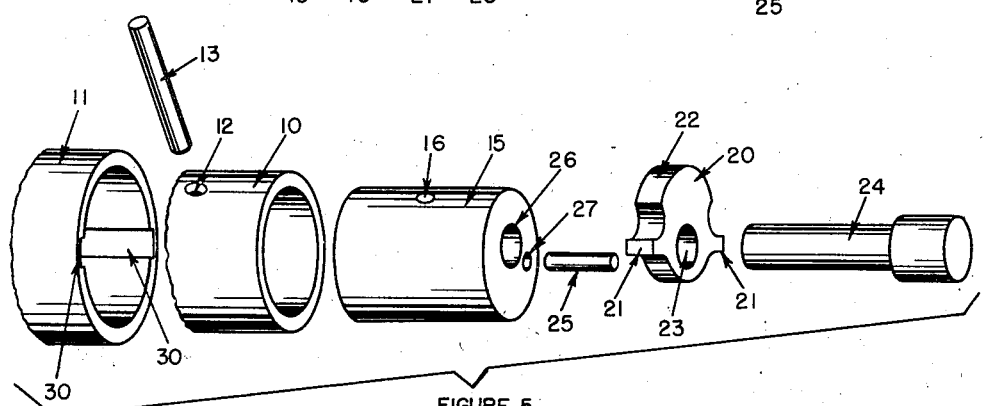
FIGURE 5
INVENTOR.
JAMES A. ZIPSER
BY *Joseph Rossman*
ATTORNEY.

Patented Dec. 2, 1947

2,432,059

UNITED STATES PATENT OFFICE 2,432,059

LOCKING DEVICE

James A. Zipser, New York, N. Y., assignor to Polyphase Machine Company, a partnership consisting of James A. Zipser and Helen G. Zipser Application May 28, 1946, Serial No. 672,887

6 Claims. (Cl. 287—58)

This invention relates to a locking device for two telescoping members such as tripod legs and analogous devices. More specifically, the invention relates to means for releasably locking in relative adjustment at any desired longitudinal position the two telescoped members of a tripod for supporting a camera or other instruments while permitting release and adjustment thereof with expedition and facility.

Numerous devices have been previously proposed for releasably locking the legs of a tripod, but such devices have not always functioned satisfactorily, either because they failed to remain locked in a given predetermined position or required considerable manipulative movements to lock or unlock them. Furthermore, such prior devices in many instances involved complicated constructions which are costly to manufacture. According to the present invention I provide a very simple and effective locking device which can be readily locked at any given predetermined position of the telescoped tripod legs and which can be easily released by partially rotating one of the telescoped members. My locking device provides a positive and secure clamping action for the two telescoped members which will not release accidentally or on account of a heavy weight supported by the tripod.

Further objects and advantages of the invention will be apparent from the following specification and drawings wherein, Figure 1 is a fragmental side view of an end portion of two telescoping members embodying the locking construction of the present invention, showing the telescoping members in unlocked position, Figure 2 is an end view of the telescoping members shown in Figure 1, Figure 3 is a view similar to that of Figure 1 showing the telescoping members in locked position, Figure 4 is an end view of Figure 3, and Figure 5 is an exploded perspective view of the disassembled elements of my locking device.

Referring to the drawing, wherein is illustrated a preferred embodiment of my invention which I have found in practice to give very satisfactory results, numerals 10 and 11 indicate two telescoping axially aligned tubular metal members of suitable diameter freely slidable on each other. These telescoping members may constitute for example the legs of a tripod for supporting a camera or other apparatus, the legs of a music stand and other devices having two telescoping members which are to be adjusted and releasably locked at predetermined relative longitudinal positions. The inner member 10 may be a solid cylindrical rod if desired instead of being a hollow tube as shown when greater rigidity and strength is desired in the supporting structure. When using a hollow inner member one end of the inner member 10 is preferably closed by a suitable cylindrical plug 15 which is secured thereto by a pin 13 passing through hole 12 adjacent the end of the tube 10 and into bore 16 provided in the plug. The upper end of the plug is provided with a bore 26 positioned eccentrically of the longitudinal axis of the inner tube 10 for receiving a pivot pin 24 therein and a smaller bore 27 spaced therefrom for receiving a stop pin 25 therein.

A relatively thin cam plate 20 of suitable contour is retained at the upper end of the plug 15 by the pivot pin 24 which passes through hole 23 provided in the cam plate. The cam plate has the contour shown in Figures 2 and 5 and is adapted to freely rotate in face contact with the upper face of the plug 15. The cam plate is provided with opposed keys or splines 21 of suitable contour and dimensions extending on each side of the cam plate. The keys are adapted to slidably engage opposed key-ways 30 provided in the inner face of outer tube 11 which are oppositely positioned and extend longitudinally of the tube 11. Cam plate 20 is provided with an arcuate vertical edge portion or cam face 22 having substantially the same radius of curvature as that of the outer tube 11. As previously stated the longitudinal bore 26 of plug 15 is preferably eccentrically positioned in relation to the longitudinal axis of the inner tube 10 so that when the cam plate 20 is rotated on pin 24 the cam face 22 will be positioned beyond the periphery of the plug 15 as shown in Figure 3. When the cam plate is in the unlocked position shown in Figures 1 and 2 the telescoping members 10 and 11 freely slide longitudinally of each other to any desired relative position and the keys or splines 21 will freely slide along the opposed key-ways 30 in outer member 11. When it is desired to releasably lock the telescoping members 10 and 11 at any desired longitudinally adjusted position the end portion of inner tube 10 is grasped by the hand and rotated clockwise while the outer member 11 is held relatively fixed. During this operation cam plate 20 will be held in fixed position in relation to the outer telescoping member 11 because the cam will be held in its initial position by the splines 21 retained in keyways 30. As the inner member 10 is being rotated the cam plate 20, being eccentrically pivoted, will act as a fulcrum for slightly displacing the inner member 10 from its axial alignment with the outer member 11. At the same time arcuate cam face 22 will be brought into frictional contact with the adjacent inner face of outer member 11 in the relation shown in Figures 3 and 4. When this occurs the inner member 10 will have been displaced or tipped out of its axial alignment with the outer member 11 to its full limit so as to bring the outer arcuate surface portion 40 thereof which is opposed to that of the arcuate cam face 22 into frictional and clamping contact with the adjacent inner surface of the outer member 11, as shown in Figures 3 and 4; to lock the telescoping members against sliding movement. The frictional engagement of the contacting portions of the two telescoped tubes and cam thus provides secure locking engagement of the two telescoping tubes which will not be released except when the inner member 10 is manually rotated in counter-clockwise direction. A stop pin 25 is provided on plug 15 so as to permit locking action of the cam plate only when tube 10 is rotated clockwise. Thus the operation will always lock the telescoped tubes only by turning the inner tube clockwise and will always unlock the tubes by turning counter-clockwise.

The cam plate 20 may be provided if desired with an eccentrically positioned hole 23 so as to increase its cam action when activated. The contour of the cam surface 22 may also be modified so as to be asymmetrical with respect to the tube curvature in order to secure a faster cam action if desired.

According to the present invention I provide a very simple and effective locking means that is easily actuated by merely partially rotating the inner telescoped tube. The locking device is adapted for use on tripod legs, lamp stands, curtain rods, radio antennae, tool and instrument handles and other devices where it is required to adjust the length of two telescoping members and to releasably lock them. My locking device will not unlock accidentally and will remain firmly locked even when comparatively heavy weights are supported by the tripod. The present locking device provides a positive clamping action between the telescopic members which is releasable only by relative rotation of the two telescopic members as previously explained. My locking device requires very few parts and can be manipulated with ease and facility and is unlikely to become injured or damaged in normal use. The shape and contour of the cam plate can be altered depending upon the contour of the telescoping members required to be locked. It is also possible to use a single key-way instead of two key-ways; although two key-ways are preferred. The locking device is not restricted to use with only two telescoping tubular members. For example, the inner tube can be replaced by a solid rod on which the outer tube is slidable. These and other modifications and changes are intended to be included within the scope of the appended claims.

I claim:

1. In a device of the character described comprising inner and outer axially aligned telescoping members, the inner telescoping member being rotatable relative to the outer telescoping member and slidable therein to any desired longitudinally adjusted position, a cam eccentrically pivoted on one end of said inner telescoping member, said cam serving as a fulcrum member upon rotation of said inner telescoping member to tilt said inner member from its axial alignment with said outer telescoping member whereby contacting surfaces of said telescoping members will be engaged in frictional and releasable locking engagement against sliding movement.

2. In a device of the character described comprising inner and outer axially aligned telescoping tubular members, the inner telescoping member being rotatable relative to the outer telescoping member and slidable therein to any desired longitudinally adjusted position, a cam eccentrically rotatably mounted on the end of said inner telescoping member, means to retain said cam in fixed relation relative to the said outer telescoping member upon relative rotation of said inner tubular member, whereby said inner telescoping member will be tilted from its axial alignment with the said outer telescoping member and is brought into frictional contacting engagement with portions of the inner surface of said outer telescoping member to lock the telescoping members against sliding movement.

3. In a device of the character described comprising inner and outer axially aligned telescoping members, a longitudinally extending key-way on the inner surface of the outer telescoping member, the inner telescoping member being rotatable relative to the outer telescoping member and slidable therein to any desired longitudinally adjusted position, a cam plate eccentrically rotatably mounted on the end of said inner telescoping member, said cam plate being provided with an extending spline, said spline being received for sliding engagement in said key-way and retaining said cam in fixed relation relative to the said outer telescoping member upon relative rotation of said inner tubular member, whereby said inner telescoping member will be tilted from its axial alignment with the said outer telescoping member and is brought into frictional contacting engagement with portions of the inner surface of said outer telescoping member to lock the telescoping members against sliding movement.

4. In a device of the character described comprising inner and outer axially aligned telescoping members, the inner telescoping member being rotatable relative to the outer telescoping member and slidable longitudinally therein to any desired longitudinally adjusted position, a cam plate eccentrically pivoted on one end of said inner telescoping member, opposed splines extending from said cam plate, opposed longitudinally extending key-ways provided in the inner face of the said outer telescoping member for slidably receiving and guiding said opposed splines, said cam plate serving as a fulcrum upon rotation of said inner telescoping member to displace said inner telescoping member from its axial alignment with the said outer telescoping member to bring the surfaces thereof into frictional engagement and lock said telescoping members against sliding movement.

5. In a telescoping tripod leg the combination of an outer tubular leg section having a longitudinally extending key-way on its inner surface, a second inner tubular section slidably and coaxially mounted within said first leg section and having a cam plate pivoted at one end thereof, said cam plate being provided with an extending spline, said spline being received for sliding engagement in said key-way, said cam plate being adapted to fulcrum said inner tubular section upon relative rotation of the said inner tubular section and to tilt said inner tubular section from its axial alignment with the said outer tubular section whereby contacting surfaces of said tubular sections are brought into frictional engagement and locked against sliding movement.

6. A telescopic leg for a tripod comprising in combination, cylindrical outer and inner tube sections and at least one frictional locking device engageable and disengageable by relative rotation of said tube sections and adapted to lock said tube sections in their longitudinally adjusted positions, said locking device comprising a pivoted cam plate affixed to one end of said inner tube section, said plate upon relative rotation thereof displacing said inner tube section from axial alignment with said outer tube section and locking the tube sections in their longitudinally adjusted positions against sliding movement by frictional contact of the respective tube surfaces and cam plate.

JAMES A. ZIPSER.

REFERENCES CITED

The following references are of record in the file of this patent:

UNITED STATES PATENTS

| Number | Name | Date |
|--------|------|------|
| 593,300 | Knight | Nov. 9, 1897 |